(12) United States Patent
Alessio et al.

(10) Patent No.: US 7,662,475 B2
(45) Date of Patent: Feb. 16, 2010

(54) ALKALINE-EARTH METAL CARBONATE CORE COATED WITH AT LEAST ONE GROUP IV TRANSITION METAL COMPOUND AND METHOD OF MAKING THEREOF

(75) Inventors: Rocco Alessio, Migliarino Pisano (IT); Vincenzo Buscaglia, Cogoleto (IT); Maria Teresa Buscaglia, Genoa (IT)

(73) Assignee: Solvay (Société Anonyme), Brussels (BE)

( * ) Notice: Subject to any disclaimer, the term of this patent is extended or adjusted under 35 U.S.C. 154(b) by 3 days.

(21) Appl. No.: 11/572,745

(22) PCT Filed: Jul. 26, 2005

(86) PCT No.: PCT/EP2005/053622
§ 371 (c)(1),
(2), (4) Date: Jun. 27, 2007

(87) PCT Pub. No.: WO2006/010754
PCT Pub. Date: Feb. 2, 2006

(65) Prior Publication Data
US 2008/0038181 A1 Feb. 14, 2008

(30) Foreign Application Priority Data
Jul. 28, 2004 (EP) .............................. 04103619

(51) Int. Cl.
B32B 5/16 (2006.01)
C01G 23/00 (2006.01)
C01F 1/00 (2006.01)

(52) U.S. Cl. ...................... 428/403; 423/69; 423/71; 423/75; 423/155

(58) Field of Classification Search ............... 428/403; 423/69, 71, 75, 155
See application file for complete search history.

(56) References Cited

U.S. PATENT DOCUMENTS

| | | | | |
|---|---|---|---|---|
| 4,670,243 A | * | 6/1987 | Wilson et al. | 423/598 |
| 4,764,493 A | * | 8/1988 | Lilley et al. | 501/137 |
| 4,859,448 A | * | 8/1989 | Klee et al. | 423/598 |
| 5,009,876 A | * | 4/1991 | Hennings et al. | 423/598 |
| 6,728,094 B2 | | 4/2004 | Nakaya et al. | |
| 2002/0135971 A1 | | 9/2002 | Nakaya et al. | |

FOREIGN PATENT DOCUMENTS

| | | |
|---|---|---|
| EP | 1 435 402 | 7/2004 |
| WO | 01 10781 | 2/2001 |
| WO | 01 66652 | 9/2001 |

* cited by examiner

*Primary Examiner*—H. (Holly) T Le
(74) *Attorney, Agent, or Firm*—Oblon, Spivak, McClelland, Maier & Neustadt, L.L.P.

(57) ABSTRACT

The invention relates to an alkaline-earth metal carbonate powder comprising a core consisting essentially of at least one alkaline-earth metal carbonate and a shell consisting essentially of at least one Group IV transition metal compound, to the method for manufacturing the same and to an improved method for preparing highly crystalline alkaline-earth metal containing mixed oxide powder. The highly crystalline mixed oxides obtained by means of the process according to the invention are used as starting material for high-performance dielectric, especially multi-layer capacitors, and for high performance dielectrics.

15 Claims, 4 Drawing Sheets

6(a)

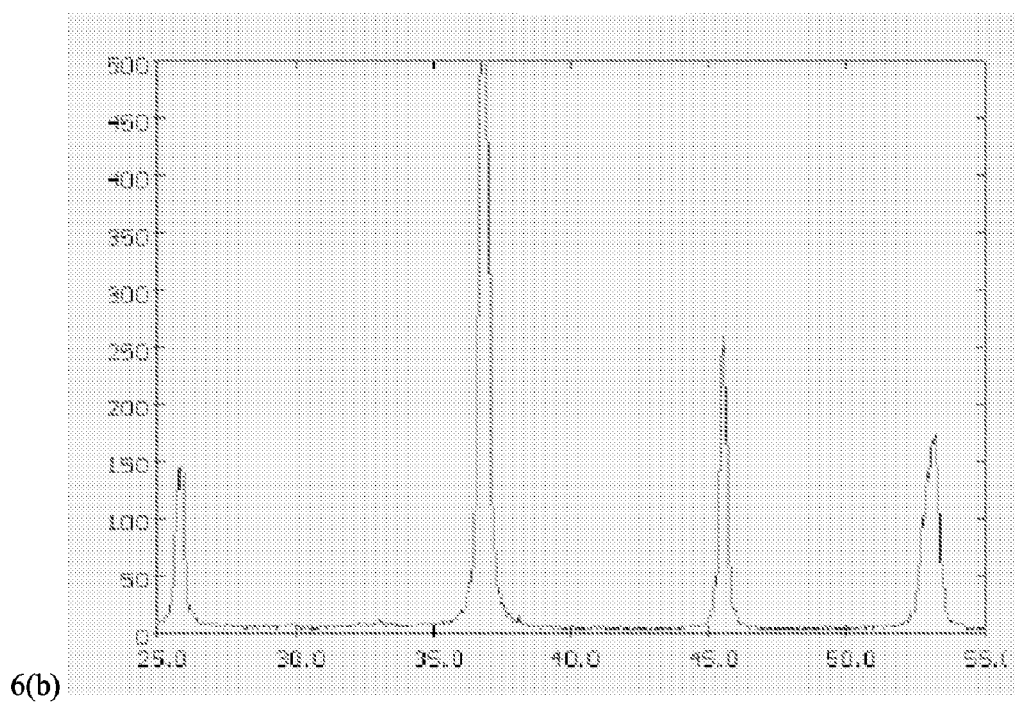
6(b)
FIG. 7
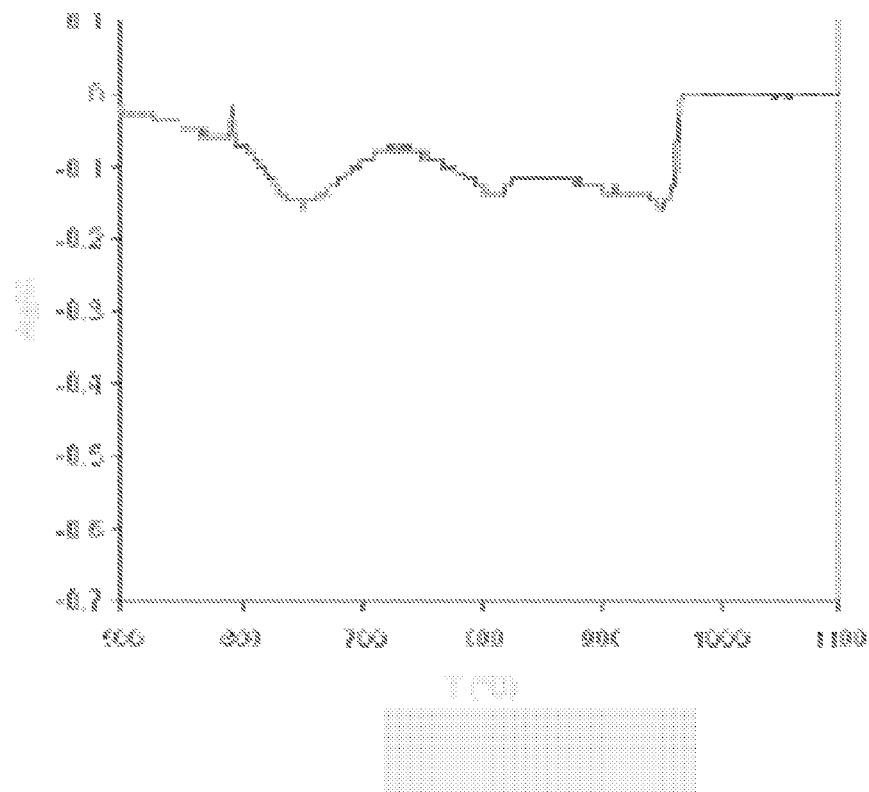

ALKALINE-EARTH METAL CARBONATE CORE COATED WITH AT LEAST ONE GROUP IV TRANSITION METAL COMPOUND AND METHOD OF MAKING THEREOF

The present invention relates to alkaline-earth metal carbonate powder, method of manufacturing the same and particularly to an improved method for preparing highly crystalline alkaline-earth metal containing mixed oxide powder.

The industrial field where alkaline-earth metal carbonate powder, especially barium carbonate powder, is applied has recently expanded. For example, studies are being made on uses over a wide range of fields, such as starting material for high-performance dielectric, magnetic tapes, multilayer ceramic capacitors and high performance ceramics.

Thus barium carbonate is often used as a starting material for Perovskite-type dielectrics ($BaTiO_3$). Such a barium titanate powder is required to be as homogeneous as possible. In other words, the composition thereof must be homogeneous. Although barium titanate powders prepared by hydrothermal synthesis or hydrolysis show high homogeneity, the powders are expensive and often possess low density, thus making them not suitable for thin dielectric film application. Thus, barium titanate powders have generally been prepared by a solid-phase reaction.

As shown in the following reaction formula 1, in the synthesis of barium titanate by the solid-phase reaction, powdered barium carbonate and powdered titanium oxide are mixed and the mixture is calcined at a temperature of 1000 to 1200° C., to produce a barium titanate dielectric material:

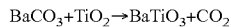
$BaCO_3 + TiO_2 \rightarrow BaTiO_3 + CO_2$    Reaction Formula 1:

In this case, barium carbonate decomposes starting at about 700° C. to produce BaO having high ionicity and this BaO diffuses into a $TiO_2$ particle to produce barium titanate.

When diffusion of BaO into the $TiO_2$ is not fast enough, locally higher than stoichiometric ratios between Ba and Ti are achieved and the solid-phase reaction may involve the formation of $Ba_2TiO_4$ as side product, according to the following reaction formula 2:

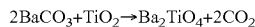
$2BaCO_3 + TiO_2 \rightarrow Ba_2TiO_4 + 2CO_2$    Reaction Formula 2:

The $Ba_2TiO_4$ then slowly reacts with $TiO_2$ to transform in $BaTiO_3$, and higher calcination temperatures are required for completely transforming this intermediate. The presence of even small amounts of $Ba_2TiO_4$ in final barium titanate has to be avoided, as it negatively affects the manufacture of multi-layer ceramic capacitors therefrom.

Also, to cope with the requirement for higher capacitance or smaller size of a ceramic capacitor, there was a demand for fine particulate barium titanate and heretofore, investigations have been made for forming fine particles of titanium oxide and barium carbonate as starting materials under the form of a mechanical mixture. The fine particle has not been clearly defined so far but, in general, indicates a fine particle having a primary particle size of about 0.3 μm or less.

However, while barium titanate is synthesized at temperature of about 1000° C. or more, both titanium oxide and barium carbonate are coarsened and sintered at about 800° C.: thus raw material particles having a particle size of 0.3 μm or less undertake vigorous growth in the vicinity of the above-described reaction temperature of 800° C.

U.S. Pat. No. 6,728,094 (to MURATA MANUFACTURING Co., Ltd.) provides for a titanium oxide powder holding a barium compound on the surface of the particles thereof, used in combination with a barium carbonate powder for manufacturing a highly crystalline fine barium titanate powder by solid-phase reaction. The barium compound on the surfaces of the titanium oxide powder particles inhibits the sintering, or the growth, of the titanium oxide during the calcination. Nevertheless, high calcination temperatures (about 1000° C.) are required to prepare the barium titanate.

International application WO 01/10781 discloses a method for preparing a precursor for the thermal synthesis of $BaTiO_3$, in which carbonate slurry of Ba and/or Sr, containing $NH_4OH$ at a pH ranging from 9.5 to 12.0 is contacted with a Ti-containing solution for obtaining a precipitate. A further step involves dispersion of said precipitate into an alcohol, addition of hydroxypropylcellulose, and dehydration of the same to form a second powder. This second powder is thermally treated at high temperature to yield $BaTiO_3$ powder.

Thus, main drawbacks of techniques of the prior art are that the solid-phase reaction shall be carried out at temperature of at least 1000° C. to obtain quantitative transformation of Ba and Ti precursors in $BaTiO_3$: the process is thus highly energy-demanding. Moreover, uncontrolled sintering of raw materials occurs at this high reaction temperature, thus disadvantageously failing in contributing to the formation of fine particulate barium titanate.

According to the present invention, the above-mentioned difficulties are remarkably overcome by the alkaline-earth metal carbonate powder comprising a core of at least one alkaline-earth metal carbonate and a shell of at least one Group IV transition metal compound, object of the present invention, capable of being advantageously used in the method of manufacturing a mixed oxide of an alkaline-earth metal and a Group IV transition metal by solid-phase reaction.

Another object of the present invention is to provide a method of manufacturing an alkaline-earth metal carbonate powder comprising a core of at least one alkaline-earth metal carbonate and a shell of at least one Group IV transition metal compound.

When the alkaline-earth metal carbonate powder comprising a core of at least one alkaline-earth metal carbonate and a shell of at least one Group IV transition metal compound is used for manufacturing a mixed oxide by solid-phase reaction, calcinating temperature can be advantageously reduced. Consequently, the resulting mixed oxide powder is highly crystalline and fine. In the case the mixed oxide is barium titanate, to the purposes of this invention, the term highly crystalline is to be intended as designating $BaTiO_3$, having a tetragonality value (c/a axial ratio) of at least 1.004.

The c/a axial ratio of the lattice parameters c and a of tetragonal $BaTiO_3$ can be notably determined by X-ray diffraction and Rietveld analysis.

Accordingly, it is still an object of the present invention to provide a method of manufacturing a mixed oxide of an alkaline-earth metal and a Group IV transition metal by solid-phase reaction.

BRIEF DESCRIPTION OF THE FIGURES

FIG. 7: Tg scan of core-shell powder of comparative example 7

Figure 1:
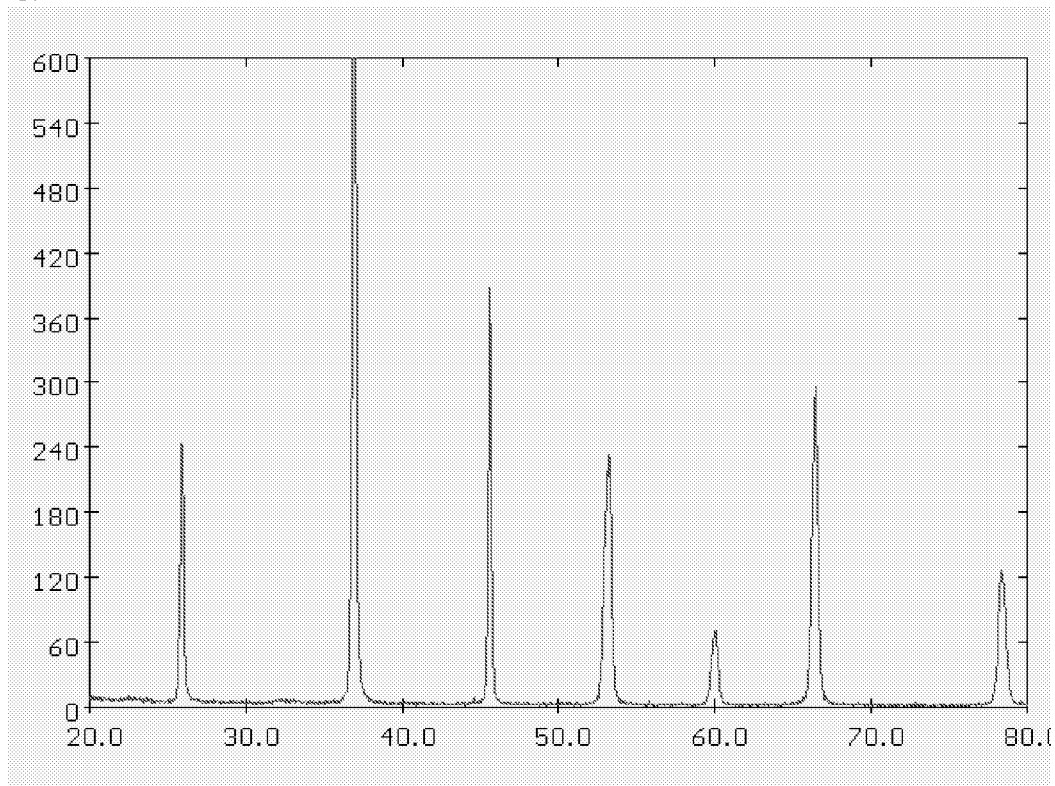
FIG. 1: X-ray diffraction spectrum of the calcined powder of example 1.

The alkaline-earth metal carbonate powder of the present invention comprises:
- a core consisting essentially of at least one alkaline-earth metal carbonate, said core having an average diameter of at most 0.25 µm; and
- a shell consisting essentially of at least one Group IV transition metal compound.

Within the context of the present invention, the term "powder" possesses its conventional meaning, i.e. designates a solid substance in the form of tiny loose particles.

The core has preferably an average diameter of at most 0.20 µm, most preferably of at most 0.15 µm, most preferably of at most 0.10 µm.

The term "average diameter of the core" is intended to denote the average value of the diameters of cross-sectional areas, associated to each of the possible differently oriented cross-sections of the cores of the alkaline-earth metal carbonate powder. The diameter of a cross-sectional area is defined as the diameter of the smallest circle which the cross-sectional area can be comprised in.

Average diameter of the core of the powder of the invention may be preferably determined by SEM microscopy and image recognition on samples of the alkaline-earth metal carbonate powder.

Average diameter is calculated by measuring surface area of cores having maximal dimension within relevant values with respect to the total area of cores in the sample analyzed by SEM microscopy and image recognition. On such basis a weighted average is thus determined.

Advantageously, the powder of the invention has an average particle size from 0.01 to 0.5 µm, preferably from 0.02 to 0.25 µm, more preferably from 0.03 to 0.1 µm.

The average particle size of the powder of the invention can be measured by X-ray monitoring of gravity sedimentation according to ASTM B761-97.

Advantageously, the alkaline-earth metal carbonate powder has a specific surface area BET of 1 to 100 m$^2$/g, preferably of 5 to 60 m$^2$/g, more preferably from 10 to 50 m$^2$/g.

The specific surface area can be measured as per the Brunauer, Emmett and Teller (BET) method of calculation, according to ISO 9277, using nitrogen.

The shell consisting essentially of Group IV transition metal compound advantageously takes the form of a material disposed on the core, preferably completely surrounding (e.g., encapsulating) the core. Still, it is possible for production processes to result in particles wherein the shell does not completely surround the core, but only partially covers the core, leaving a portion of the core exposed. These particles, if produced, will typically be present in relatively small amounts, typically less than 10% compared to core/shell particles where the shell does completely surround or encapsulate the core.

The term "at least one alkaline-earth metal carbonate" is understood to mean that the core may consist essentially of one or more than one alkaline-earth carbonate.

Similarly, the term "at least one Group IV transition metal compound" is understood to mean that the shell may consist essentially of one or more than one Group IV transition metal compound.

The core and/or the shell of the powder of the invention may further comprise other cations and/or anions, moisture, additives and other ingredients which are used in the manufacturing process. Said components are generally present in reduced amount, typically as traces, and do not interfere with the properties and chemical behavior of the powder of the invention.

The powder according to the invention preferably comprises a core consisting essentially of at least one carbonate chosen among the group consisting of magnesium carbonate, calcium carbonate, strontium carbonate, barium carbonate, and mixtures thereof. More preferably, it comprises a core consisting essentially of barium or strontium carbonate, or of a mixture thereof. Most preferably it comprises a core consisting essentially of barium carbonate.

The powder of the invention advantageously comprises a shell consisting of at least one compound chosen among the group consisting of titanium compounds, zirconium compounds, hafnium compounds and mixtures thereof. More preferably it comprises a shell consisting essentially of at least one titanium compound.

Typically, the alkaline-earth metal carbonate powder according to the invention preferably comprises a shell consisting of a Group IV transition metal compound, wherein part of the Group IV transition metal compound is a reaction product of the Group IV transition metal compound with the alkaline-earth metal carbonate at the surface of the particles of the powder of the invention.

Advantageously, when the Group IV transition metal compound is a titanium compound, the shell comprises $TiO_2$, in amorphous and/or crystalline form. Preferably, the shell comprises $TiO_2$ in an at least partially crystalline form.

The Group IV transition metal content in the alkaline-earth metal carbonate powder according to the invention is advantageously of at least 0.001, preferably of at least 0.01, more preferably of at least 0.1 mol per mol of alkaline-earth metal.

The Group IV transition metal content in the powder according to the invention is advantageously of at most 1.5, preferably of at most 1.05, more preferably of at most 1.03 mol per mol of alkaline-earth metal.

Advantageously, the Group IV transition metal content in the powder of the invention is in the range of 0.001 to 1.05 mol per mol of alkaline-earth metal.

Very satisfactory results were obtained with Group IV transition metal content in the powder of the invention of 0.95 to 1.02 mol per mol of alkaline-earth metal.

The powder of the invention may further comprises at least one other layer of a third material which can be the same of different from the materials of the core and of the shell. For instance, the core may comprise a further coating consisting essentially of at least one alkaline-earth metal carbonate, either completely surrounding (e.g., encapsulating) or partially covering the powder. Optionally, the powder of the invention may be further coated with a suitable coating additive, such as a dispersing agent, a stabilizer, an antistatic agent and the like.

Preferably the powder of the invention consists essentially of a core and a shell as above defined.

Another object of the invention is a method of manufacturing an alkaline-earth metal carbonate powder.

The alkaline-earth metal carbonate powder according to the invention can be prepared by any suitable manufacturing method, well known to those skilled in the art. The process of the invention is particularly adapted to the manufacture of the alkaline-earth metal carbonate powder as above described.

The process of the invention comprises:
- mixing particles of at least one alkaline-earth metal carbonate, a solvent and at least one Group IV transition metal-containing material at least partially soluble in the solvent to form an alkaline-earth metal carbonate slurry, said alkaline-earth metal carbonate having an average particle size of at most 0.25 µm;

heating said slurry at a temperature from 20 to 200° C.; and removing the solvent from the slurry so that the Group IV transition metal compound is present on the surface of the alkaline-earth metal carbonate particles.

In the process according to the invention, the alkaline-earth metal carbonate particles may be notably mixed to the other components to yield the alkaline-earth metal carbonate slurry either as dry particles or as suspension in a solvent.

It is to be understood that the steps above mentioned of mixing and heating can be realized sequentially, first mixing and then heating, or simultaneously, i.e. carrying out the mixing under heating at a temperature between 20 and 200° C.

Preferably the alkaline-earth metal carbonate is magnesium, calcium, strontium or barium carbonate, or a mixture thereof. Preferably, it is barium or strontium carbonate, or a mixture thereof. More preferably it is barium carbonate.

For the purpose of the invention the term "particle" is intended to denote a mass of material that has a definite three-dimensional volume and shape, characterized by three dimensions.

The alkaline-earth metal carbonate has an average particle size of preferably at most 0.20 µm, more preferably of at most 0.175 µm, most preferably of at most 0.15 µm, most preferably at most 0.10 µm.

Alkaline-earth metal carbonates having an average particle size from 0.04 to 0.25 µm gave very satisfactory results. Excellent results have been obtained with alkaline-earth metal carbonate having an average particle size from 40 to 100 nm.

The average particle size can be measured by X-ray monitoring of gravity sedimentation according to ASTM B761-97.

Advantageously, the alkaline-earth metal carbonate has a specific surface area of at least 5 m$^2$/g, preferably of at least 7 m$^2$/g, more preferably of at least 10 m$^2$/g.

Advantageously, the alkaline-earth metal carbonate has a specific surface area of at most 100 m$^2$/g, preferably of at most 60 m$^2$/g, more preferably of at most 50 m$^2$/g.

The specific surface area can be measured as per the Brunauer, Emmett and Teller (BET) method of calculation, according to ISO 9277, using nitrogen.

Alkaline-earth metal carbonates having a specific surface area from 15 to 40 m$^2$/g gave very satisfactory results.

Thanks to the small particle size of the alkaline-earth carbonate, and optionally in addition to the high surface area of the same, the process of the invention is advantageously effective in providing highly reactive core-shell powder for preparing mixed oxide. Thus lower calcinating temperature can be used and pure mixed oxides are formed with no substantial side-product.

When the alkaline-earth carbonate has an average particle size exceeding 0.25 µm, the process of the invention fails to yield suitable precursors for preparing mixed oxide. In particular when the alkaline-earth carbonate is $BaCO_3$ and the Group IV transition metal-containing material is a Ti-containing material, coarse $BaCO_3$, having an average particle size exceeding 0.25 µm fails to efficiently react with the Ti compound during the calcinating step to prepare $BaTiO_3$ and undesirable side-products like $Ba_2TiO_4$ are formed.

The solvent may be water or an organic solvent, such as alcohols. Preferably the solvent is water or ethanol, more preferably is water.

The Group IV transition metal-containing material should be at least partially soluble in the solvent. When the Group IV transition metal is titanium, examples of suitable at least partially soluble materials are titanium halides, like titanium tetrachloride; titanium oxy-halides like $TiOCl_2$, titanium oxy-compounds, e.g. titanyl salts, such as titanyl sulphate ($TiOSO_4$), titanium alkoxides, like titanium tetra-methoxide, titanium tetra-ethoxide, titanium tetra-allyloxide, titanium tetra-n-propoxide, titanium tetra-isopropoxide, titanium tetra-n-butoxide, titanium tetra-isobutoxide, titanium tetra-sec-butoxide, titanium tetra-tert-butoxide, titanium tetra-n-pentoxide, titanium tetra-cyclopentyloxide, titanium tetra-n-hexyloxide, titanium tetra-cyclohexyloxide, titanium tetra-benzyloxide, titanium tetra-n-octyloxide, titanium tetra-2-ethylhexyl-oxide and titanium tetra-isooctyloxide; titanium alkoxy-halides having the formula $Ti(OR)_nX_{4-n}$, where R may be alkyl, alkenyl, or aryl, and X is F, Cl, Br, or I and n is an integer from 1 to 3; titanium hydroxycarboxylic acid complexes, like titanium lactate and titanium bis-ammonium lactate dihydroxide; alkaline-stable ammonium or metal titanium tartrates, malates and citrates, like $M_yTiO(citrate)_x$, where M is $NH_4$, Na, K, Ca, or Ba and x and y are independently an integer chosen for satisfying neutrality; titanium β-diketone chelates, like $Ti(acac)_2(X)_2$, where acac is the acetylacetonate ligand and X is methoxy, ethoxy, isopropoxy, n-butoxy, or chloro; metal titanates, like $Na_2TiO_3$, $Na_4TiO_4.0.32H_2O$, $Na_2TiO_3.1.45H_2O$, $Li_2TiO_3$, $K_2TiO_3$, $CaTiO_3$, $SrTiO_3$, $BaTiO_3$.

Preferably, the titanium compound is a titanium tetrahalide, a titanium oxy-halide, a titanium alkoxide, a titanium alkoxy-halide or a titanium hydroxycarboxylic acid complex. More preferably, the titanium compound is titanium tetrachloride.

In the process according to the invention, the Group IV transition metal-containing material may be notably mixed to the other components to yield the alkaline-earth metal carbonate slurry either as pure (neat) compound or in solution with a solvent.

The term "Group IV transition metal-containing material at least partially soluble in the solvent" is understood to mean that the Group IV transition metal-containing material and the solvent are chosen so as to be able to yield a solution having a concentration of at least 0.01 M of Group IV transition metal material in the solvent.

Advantageously, the alkaline-earth carbonate slurry also comprises an acid or a base to adjust the pH and, optionally, to control the hydrolysis and precipitation of the Group IV transition metal compound. Suitable acids or bases are well known in the art. Examples of acids and bases which can be used in the process according to the inventions are notably HCl, carboxylic acids, such as acetic acid, NaOH, $NH_4OH$, ammonium salts like $NH_4X$ (X=halogen atom), urea, trialkylamines such as triethylamine, and corresponding alkylamonium salts, alkyl-alkanolamine, such as triethanolamine, dimethylethanolamine and corresponding alkyl-alkanolamonium salts. Preferably the slurry comprises a base chosen among NaOH and $NH_4OH$.

The alkaline-earth metal carbonate slurry has a pH of advantageously at least about 6, preferably of at least about 7.

The alkaline-earth metal carbonate slurry has a pH of advantageously at most about 12, preferably of at most about 11, more preferably at most about 10.

Good results were obtained when the pH of the slurry was comprised between about 7 and about 10.

Optionally, the alkaline-earth metal carbonate slurry further comprises a dispersing agent. Preferably, the dispersing agent is present in a concentration from 5 to 10 000 ppm, preferably from 10 to 5 000 ppm in the alkaline-earth metal carbonate slurry. Preferably, the dispersing agent is a polyacrylic acid, an ammonium polymethylmethacrylate, an alkyl phenol ethoxylate, a polyhydroxystearic acid, a polylactone, a poly(diallyldimethylammonium chloride), a polyethylenimine, a poly(styrenesulphonate), a poly(allylaminechloride). More preferably, the dispersing agent is chosen in the group consisting of polyacrylic acid, ammonium polymethylmethacrylate, poly(styrenesulphonate), and mixtures thereof.

The alkaline-earth metal carbonate slurry comprising the solvent, the alkaline-earth metal carbonate and the partially soluble Group IV transition metal compound is heated at a temperature of preferably from 20 to 150° C., more preferably from 20 to 100° C.

Advantageously, the above mentioned alkaline-earth metal carbonate slurry is heated for at least 15 minutes, preferably for at least 30 minutes, more preferably for at least 1 hour.

Advantageously, the above mentioned alkaline-earth metal carbonate slurry is heated for at most 12 hours, preferably for at most 6 hours, more preferably for at most 5 hours.

Should the Group IV transition metal compound precipitate from the alkaline-earth metal carbonate slurry onto the alkaline-earth metal carbonate particles, the solvent and other soluble constituents may be advantageously removed from the powdered mixture by methods well-known in the art, like, for example, filtration, centrifugation, settlement and decantation and the like, to separate out a powdered mixture.

Should the Group IV transition metal compound remain soluble or partially soluble in the alkaline-earth metal carbonate slurry, the solvent and other volatile constituents are advantageously removed from the alkaline-earth metal carbonate slurry by methods well known in the art, like, for example, spray drying, to separate out a powdered mixture.

The alkaline-earth metal carbonate powder is advantageously dried after synthesis, by heating at temperatures from 25 to 300° C., preferably from 40 to 250° C., more preferably from 50 to 150° C.

Optionally, the alkaline-earth metal carbonate powder can be dried by freeze drying technique, well-known to those skilled in the art.

Optionally, the alkaline-earth metal carbonate powder can be further pulverized with a dry mill or the like, to achieve the required particle size.

According to a preferred embodiment of the invention, the alkaline-earth metal carbonate slurry further comprises a stabilizing agent for the Group IV transition metal-containing material. Such stabilizing agents advantageously inhibit hydrolysis of the Group IV transition metal-containing material and/or stabilize solutions of said materials.

Such stabilizers for the Group IV transition metal-containing material are well-known in the art.

Suitable stabilizers are notably chosen from the group consisting of:
urea;
amines of formula $NH_xR_{3-x}$, wherein R is and alkyl, alkanol or aryl group, linear or branched, substituted or not, and x is an integer comprised between 0 and 3;
peroxocompounds, such as hydrogen peroxide, carboxylic peroxyacids and the like;
chelating ligands chosen among bi- or polydentate organic ligands; examples of suitable chelating ligands are notably diols and polyols; α-hydroxycarboxylic acids like lactic acid, malic acid, tartaric acid, citric acid; di- or poly-carboxylic acids, like oxalic acid; β-ketoesters, like ethylacetoacetate; β-diketones, like acetylacetone; and mixtures thereof.
Very good results have been obtained with urea and hydrogen peroxide; hydrogen peroxide gave excellent results.

The resulting alkaline-earth metal carbonate powder comprising a core of at least one alkaline-earth metal carbonate and a shell of at least one Group IV transition metal compound can be advantageously used for preparing a highly crystalline mixed oxide.

Thus is still an object of the invention a method of manufacturing a mixed oxide, preferably a highly crystalline mixed oxide, of an alkaline-earth metal and a Group IV transition metal by solid-phase reaction, comprising heating an alkaline-earth metal carbonate powder according to the invention, at a temperature of at least 500° C.

The powder according to the invention is optionally mixed with at least one Group IV transition metal compound, such as titanium oxide, to prepare a powder mixture. If wet blending is applied for preparing the powder mixture, the powder is advantageously dried before use.

Advantageously, the powder according to the invention, optionally in powder mixture with a Group IV transition metal compound, is calcined, e.g., in a batch furnace, to synthesize the mixed oxide.

The powder of the invention or the powder mixture as above described is heated at a temperature of preferably at least 600° C., more preferably 650° C.

Advantageously, the powder of the invention or the powder mixture as above described is heated at a temperature of at most 1000° C., preferably at most 900° C., more preferably at most 850° C.

Advantageously, the powder of the invention or the powder mixture as above described is heated for at least 30 minutes, preferably for at least 1 hour.

Advantageously, the powder of the invention or the powder mixture as above described is heated for at most 12 hours, preferably for at most 6 hour.

In this instance, the core-shell structure of the alkaline-earth metal carbonate powder of the invention notably inhibits the sintering, the growth of the particles and enables reaction taking place at lower temperatures, thus advantageously leading to a highly crystalline fine mixed oxide powder.

When the alkaline-earth metal carbonate is $BaCO_3$ and the Group IV transition metal is titanium, the highly crystalline fine mixed oxide powder of $BaTiO_3$ advantageously has a tetragonality value (c/a axial ratio) of at least 1.004.

The highly crystalline mixed oxides obtained by means of the process according to the invention are advantageously used as starting material for high-performance dielectric, especially multi-layer capacitors.

Multilayer ceramic capacitors comprising laminated dielectric layers are preferably prepared by forming into a sheet a barium titanate-containing powder prepared from the alkaline-earth metal carbonate powder of the invention and by sintering the sheet.

The present invention is described in greater detail below by referring to the Examples; however, the present invention is not limited to these examples.

The BET surface area is measured as per the Brunauer, Emmett and Teller method of calculation, according to ISO 9277, using nitrogen.

Equivalent BET diameter was determined according to the following equation (equation 1):

$$d_{BET} = \frac{6}{S.A._{BET} \times \rho}$$

where:

S.A.$_{BET}$ is the specific surface area as determined by BET method;

$\rho$ is the density of the material measured by helium picnometry.

X-rays analyses were performed using Co K$\alpha$ radiation and Bragg-Brentano geometry.

Average diameter of the core of the core-shell powder has been determined by SEM microscopy and image recognition. Average diameter is calculated by measuring surface area of cores having maximal dimension within relevant values with respect to the total area of cores in the sample analyzed by SEM microscopy and image recognition. On such basis a weighted average is thus determined.

The average particle size distributions were measured by means of an X-ray disc centrifuge (BI-XDC, Brookhaven Instruments Corporation) by X-ray monitoring of gravity sedimentation according to ASTM B761-97, after dispersion of the material in water. The size corresponding to 50% of the cumulative distribution is denoted as $d_{50}$ and represents the mean particle size. The span of the distribution was calculated as $d_{50}/(d_{90}-d_{10})$, where $d_{90}$ and $d_{10}$ are size parameters directly obtained from the measured particle size distribution.

The c/a ratio of the lattice parameters c and a of tetragonal BaTiO$_3$ was determined by X-ray diffraction and Rietveld analysis.

Thermogravimetric determinations were carried out on a Setaram (Caluire, France) mod. LabSys apparatus under a dry air flow (0.1 l/min), with a heating rate of 5° C./min, from room temperature (25° C.) up to a temperature of 1300° C.

The density ($\rho$) of the materials was measured by helium picnometry.

EXAMPLE 1

An aqueous suspension of barium carbonate in water has been prepared by adding 29.06 g of a BaCO$_3$ powder sold by Solvay Bario e Derivati S.p.A. having a specific surface area BET of 31.2 m$^2$/g (corresponding to an equivalent BET diameter of 48 nm) and a $d_{50}$ of 80 nm to 200 ml of an aqueous solution of NaOH (5 M). To this suspension kept under vigorous stirring at 100° C., 27.86 g TiCl$_4$, corresponding to an equimolecular amount to BaCO$_3$, has been added. After 1 hour, the powder has been recovered by filtration, rinsed with water and dried.

Next, the resulting titanium-coated barium carbonate powder has been calcined in a batch furnace during 2 hour at 700° C.

The calcined product has been characterized by X-ray diffraction analysis, resulting in pure BaTiO$_3$. FIG. 1 shows the X-ray spectrum of the so-obtained BaTiO$_3$ powder (relative intensity as a function of 2 theta).

EXAMPLE 2

The procedure of example 1 has been repeated, but an aqueous solution of NH$_4$OH (2.5 M) has been used as solvent, and the temperature has been kept at 80° C.

Next, the resulting titanium-coated barium carbonate powder has been calcined in a batch furnace during 6 hour at 700° C.

Figure 2:
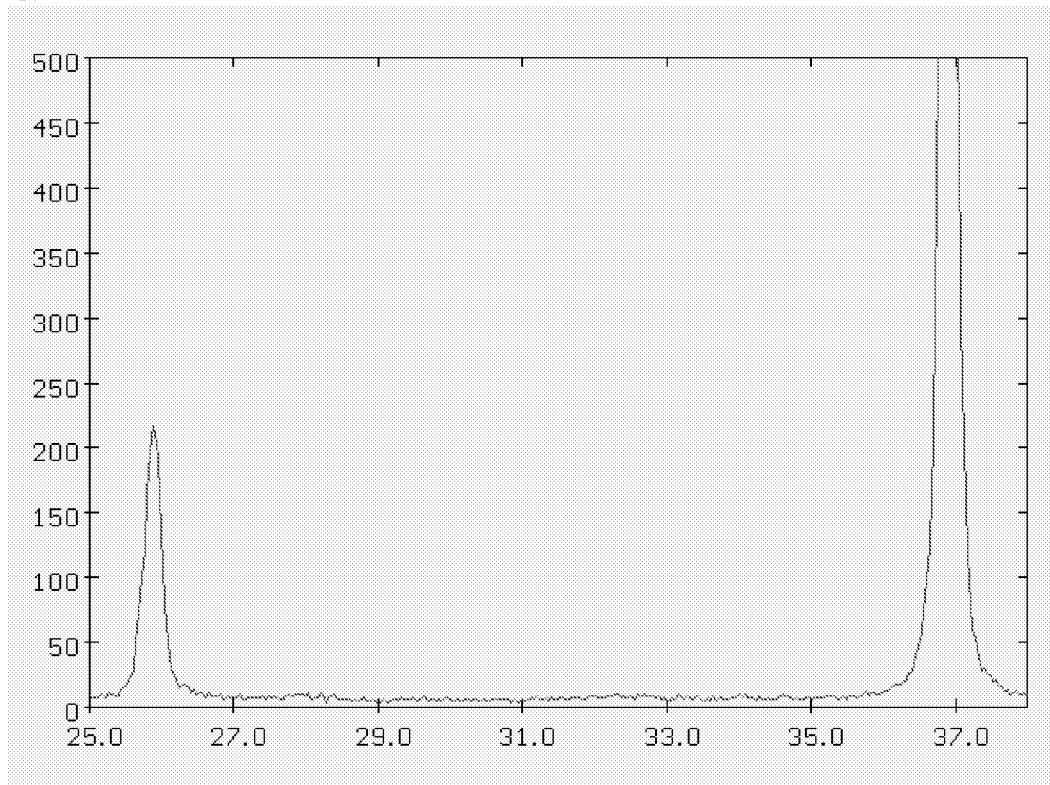
FIG. 2: Magnification of the X-ray spectrum of the calcined powder of example 2 in the spectral region between 2 theta=25 and 2 theta=38

The calcined product has been characterized by X-ray diffraction analysis, resulting pure BaTiO$_3$. FIG. 2 shows a magnification of the X-ray spectrum of the so-obtained BaTiO$_3$ powder (relative intensity as a function of 2 theta) in the spectral region between 2 theta=25 and 2 theta=38.

EXAMPLE 3

The procedure of example 2 has been repeated, but a commercially available polyacrylic acid has been used as dispersing agent (polyacrylic acid, 63% aqueous solution, supplied from Acros Organics) for preparing the barium carbonate dispersion.

Figure 3:
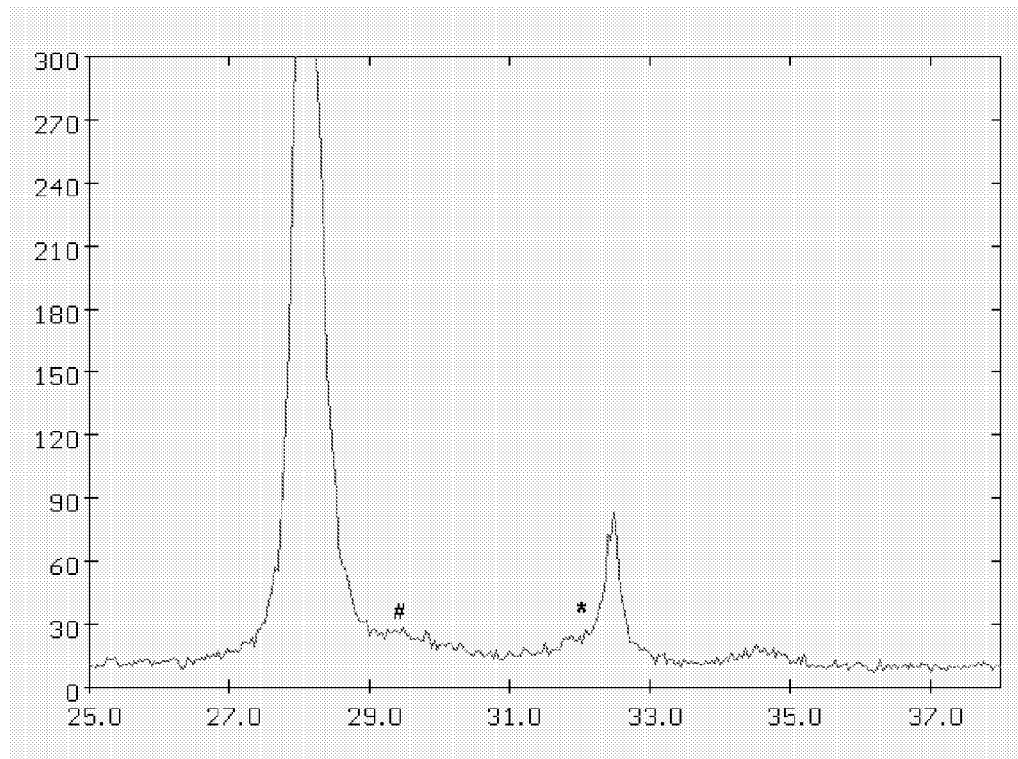
FIG. 3: X-ray diffraction spectrum of the titanium-coated barium carbonate powder of example 3.

The titanium-coated barium carbonate powder has been characterized by X-ray diffraction analysis, confirming the presence of rutile TiO$_2$ crystalline phase (peak denoted with *) and anatase TiO$_2$ crystalline phase (peak denoted with # in FIG. 3). FIG. 3 shows a magnification of the X-ray spectrum (relative intensity as a function of 2 theta) of the titanium-coated barium carbonate powder in the spectral region between 2 theta=25 and 2 theta=38.

The titanium-coated barium carbonate powder has been characterized by SEM microscopy and image recognition and was found to have a core average diameter of 50 nm.

Next, the resulting barium carbonate powder has been calcined in a batch furnace during 4 hour at 700° C.

Figure 4:
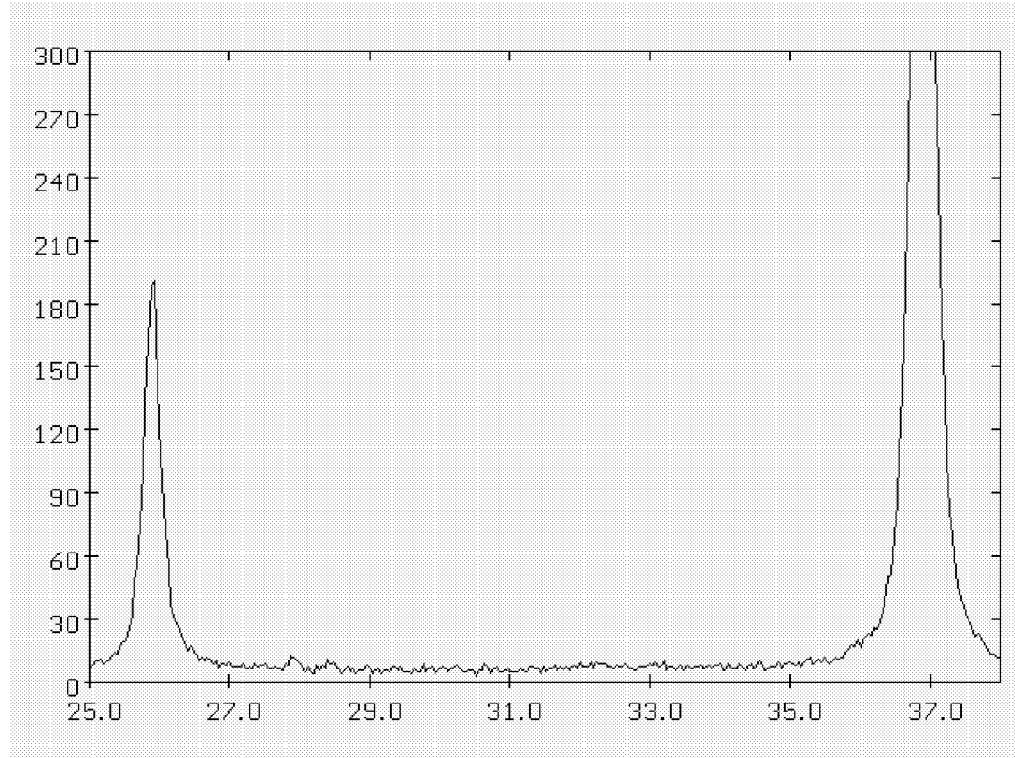
FIG. 4: X-ray diffraction spectrum of the calcined powder of example 3

The calcined product has been characterized by X-ray diffraction analysis, resulting in pure BaTiO$_3$. FIG. 4 shows a magnification of the X-ray spectrum (relative intensity as a function of 2 theta) of the so-obtained BaTiO$_3$ powder in the spectral region between 2 theta=25 and 2 theta=38.

The calcined product showed a surface area S.A.$_{BET}$ of 13.78 m$^2$/g, an equivalent BET diameter $d_{50}$ of 148.0 nm and a tetragonality value (c/a axial ratio) of 1.005.

Results of determinations are listed in Table 1.

TABLE 1

| T of thermal treatment (° C.) | Holding time (hours) | Phase composition | c/a ratio | $\rho$ (g cm$^{-3}$) | S.A.$_{BET}$ (m$^2$ g$^{-1}$) | $d_{BET}$ (nm) | $d_{50}$ (nm) | span |
|---|---|---|---|---|---|---|---|---|
| 700 | 4 | BaTiO$_3$ | 1.005 | 5.74 | 13.78 | 76.8 | 148.0 | 1.4 |

EXAMPLE 4

A 30% solution of hydrogen peroxide (21 ml) was added to a 0.13M solution of titanium tetrachloride (TiCl$_4$) in water (300 ml) while stirring. During preparation, the temperature of the solution was kept below 5° C. A 6M solution of ammonium hydroxide in water (about 50 ml) was slowly added to the resulting clear solution until the pH attains a value around 9. A barium carbonate (BaCO$_3$) powder with specific surface area of 30 m$^2$/g (8.46 g) and a $d_{50}$ of 80 nm was suspended in the final yellow transparent solution and the resulting suspension is then slowly heated up to a temperature 95° C. The relative amounts of barium carbonate and titanium tetrachloride corresponded to a Ba/Ti molar ratio in the suspension of 1.00. The suspension was kept at the set-point temperature of 95° C. for 5 hours. The solid phase was separated from the liquid, washed with distilled water and finally dried.

The core-shell powder was submitted to thermogravimetrical analysis to determine loss of weight as a function of the temperature, corresponding to the reaction:

$$BaCO_3 + TiO_2 \rightarrow BaTiO_3 + CO_2$$

Figure 5:
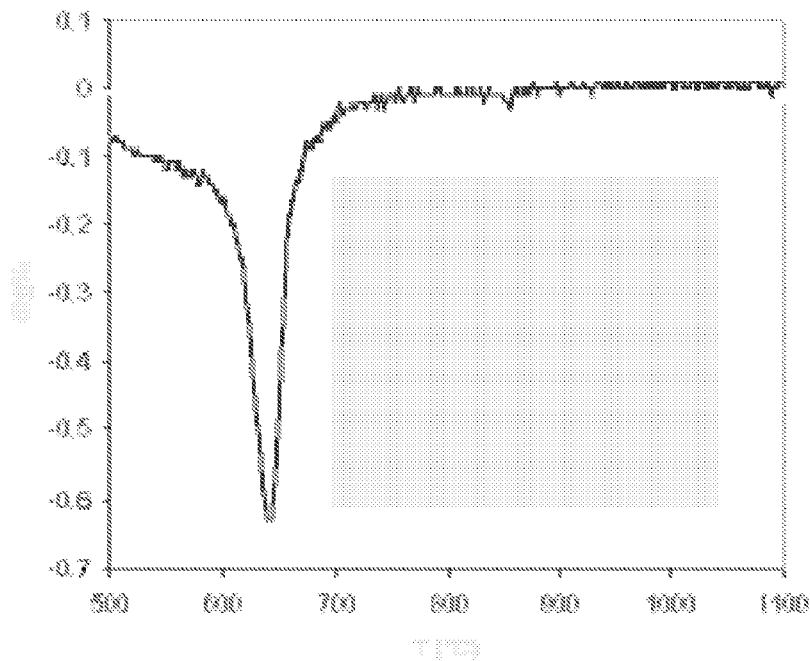
FIG. 5: Tg scan of core-shell powder of example 4

It can be noted from the $T_g$ scan [weight loss derivative (dtg %) as a function of T (° C.)] depicted in FIG. 5, that the loss of weight due to the evolution of carbon dioxide occurs shapely at a temperature of 650° C.: at this temperature the reaction is thus already quantitative.

The so-obtained core-shell powder was heated in air in a batch furnace to a temperature between 650 and 800° C. Distinct heat treatments were performed at 650, 700 and 800° C. The powder was kept at the set-point temperature for a time between 2 and 4 hours. During heating, the powder was allowed to stay at a temperature between 300 and 400° C. for a time between 1 and 8 hours.

Figure 6:
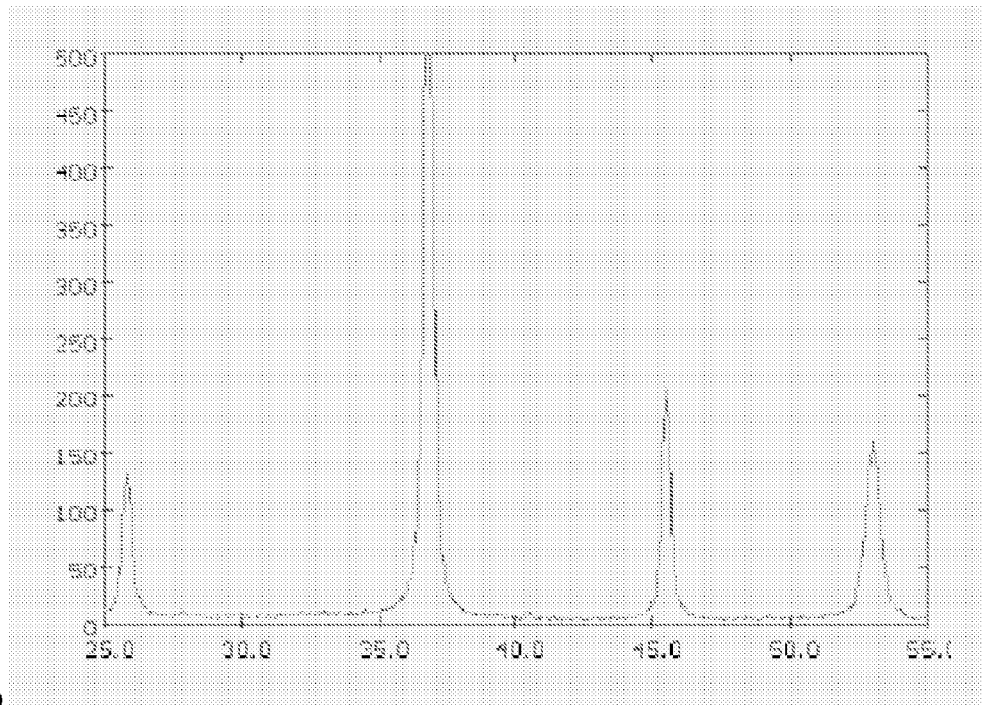
FIG. 6: X-rays diffraction spectra for calcined product from example 5, after heat treatment; 6(a) for 2 hours at 700° C., 6(b) for 2 hours at 800° C.

The phase composition of the calcined powder was determined by X-ray diffraction. The calcined powder was exclusively composed of single phase barium titanate, $BaTiO_3$, with tetragonal crystal structure. X-rays diffraction spectra (relative intensity as a function of 2 theta) for the calcined powder is depicted in FIG. 6.

The results of analytical determinations are summarized in Table 2.

shorter than 8 hours contain, beside barium titanate, still measurable amounts of $BaCO_3$ and $TiO_2$. Only the powder calcined at 800° C. for 8 hours was exclusively composed of single phase barium titanate, $BaTiO_3$, with tetragonal crystal structure. Results of analytical determinations are shown in Table 2.

TABLE 2

| T of thermal treatment (° C.) | Holding time (hours) | Phase composition | c/a ratio | ρ (g cm$^{-3}$) | S.A.$_{BET}$ (m$^2$ g$^{-1}$) | d$_{BET}$ (nm) | d$_{50}$ (nm) | span |
|---|---|---|---|---|---|---|---|---|
| 800 | 8 | BaTiO$_3$ | 1.0045 | 5.78 | 9.3 | 112 | 270 | 1.4 |

COMPARATIVE EXAMPLE 6

The procedure of example 5 was repeated, but a barium carbonate ($BaCO_3$) powder with specific surface area of 2 m$^2$/g and d$_{50}$ of 1290 nm was used. Results obtained from different heating treatments are summarized in table 3.

TABLE 3

| T of thermal treatment (° C.) | Holding time (hours) | Phase composition |
|---|---|---|
| 800 | 2 | BaTiO$_3$ + BaCO$_3$ + TiO$_2$ |
| 900 | 2 | BaTiO$_3$ (mainly) + BaCO$_3$ + TiO$_2$ + Ba$_2$TiO$_4$ |
| 1000 | 2 | BaTiO$_3$ |

TABLE 2

| T of thermal treatment (° C.) | Holding time (hours) | Phase composition | c/a ratio | ρ (g cm$^{-3}$) | S.A.$_{BET}$ (m$^2$ g$^{-1}$) | d$_{BET}$ (nm) | d$_{50}$ (nm) | span |
|---|---|---|---|---|---|---|---|---|
| 650 | 4 | BaTiO$_3$ | 1.006 | 5.67 | 19.1 | 55 | — | — |
| 700 | 2 | BaTiO$_3$ | 1.006 | 5.73 | 17.4 | 60 | 140 | 0.9 |
| 800 | 2 | BaTiO$_3$ | 1.006 | 5.87 | 12.6 | 81 | 143 | 0.9 |

COMPARATIVE EXAMPLE 5

A barium carbonate powder holding no titanium compound on the surface was used for preparing a barium titanate powder, using as starting materials a barium carbonate ($BaCO_3$) powder, with specific surface area of 30 m$^2$/g and d$_{50}$ of 80 nm, and a titanium dioxide ($TiO_2$) powder with specific surface area of 22 m$^2$/g. These starting materials were weighed so that the Ba/Ti molar ratio was 1.00 and were mixed. The resulting mixture was sieved and heat-treated at temperatures between 650 and 800° C. for times between 2 and 8 h in air in a batch furnace. Distinct heat treatments were performed at 650, 700 and 800° C. The phase composition of the calcined powder was determined by X-ray diffraction. The powders calcined at temperatures lower than 800° C. contain, besides barium titanate, significant amounts of $BaCO_3$ and $TiO_2$. The powders calcined at 800° C. for a time

COMPARATIVE EXAMPLE 7

Same procedure as example 4 was repeated but using a barium carbonate ($BaCO_3$) powder having specific surface area of 2 m$^2$/g and d$_{50}$ of 1290 nm, instead of the above mentioned $BaCO_3$ grade.

The core-shell powder was submitted to thermogravimetrical analysis to determine loss of weight as a function of the temperature, corresponding to the reaction:

$$BaCO_3 + TiO_2 \rightarrow BaTiO_3 + CO_2$$

It can be noted from the $T_g$ scan [weight loss derivative (dtg %) as a function of T (° C.)] depicted in FIG. 7, that the loss of weight due to the evolution of carbon dioxide occurs within a broad temperature range, via a stepwise process which is completed only at temperature as high as 1000° C.

The resulting core-shell powder was heated in air in a batch furnace to a temperature 800° C. During heating, the powder was allowed to stay at a temperature between 300 and 400° C. for 4 hours. The powder was kept to the final heating temperature of 800° C. for 2 hours. The phase composition of the calcined powder was determined by X-ray diffraction. The calcined powder was found to be composed of a mixture of BaTiO$_3$ (mainly), BaCO$_3$, TiO$_2$ and Ba$_2$TiO$_4$.

The invention claimed is:

1. An alkaline-earth metal carbonate powder comprising:
    a core consisting essentially of at least one alkaline-earth metal carbonate, said core having an average diameter of at most 0.25 µm; and
    a shell consisting essentially of at least one Group IV transition metal compound.

2. The alkaline-earth metal carbonate powder according to claim 1, comprising a core consisting essentially of barium carbonate.

3. The alkaline-earth carbonate powder according to claim 1, comprising a shell consisting essentially of at least one titanium compound.

4. The alkaline-earth metal carbonate powder according to claim 1, wherein the Group IV transition metal content is in the range of 0.001 to 1.05 mol per mol of alkaline-earth metal.

5. The alkaline-earth metal carbonate powder according to claim 1, wherein the core has an average diameter of at most 0.20 µm.

6. The alkaline-earth metal carbonate powder according to claim 1, wherein the core has an average diameter of at most 0.15 µm.

7. The alkaline-earth metal carbonate powder according to claim 1, wherein the core has an average diameter of at most 0.10 µm.

8. The alkaline-earth metal carbonate powder according to claim 1, wherein the powder has an average particle size from 0.02 to 0.25 µm.

9. The alkaline-earth metal carbonate powder according to claim 1, wherein the powder has an average particle size from 0.03 to 0.1 µm.

10. A method of manufacturing an alkaline-earth metal carbonate powder, said method comprising:
    mixing particles of at least one alkaline-earth metal carbonate, a solvent and at least one Group IV transition metal-containing material at least partially soluble in the solvent to form an alkaline-earth metal carbonate slurry, said alkaline-earth metal carbonate having an average particle size of at most 0.25 µm;
    heating said slurry at a temperature from 20 to 200° C.; and
    removing the solvent from the slurry so that the Group IV transition metal compound is present on the surface of the alkaline-earth metal carbonate particles.

11. The method according to claim 10, wherein the alkaline-earth metal carbonate has a specific surface area of at least 5 m$^2$/g.

12. The method according to claim 10, wherein the alkaline-earth metal carbonate slurry further comprises a dispersing agent.

13. The method according to claim 10, wherein the alkaline-earth metal carbonate slurry further comprises a stabilizing agent for the Group IV transition metal-containing material.

14. The method according to claim 13, wherein the stabilizing agent for the Group IV transition metal-containing material is chosen among the group consisting of:
    urea;
    amines of formula NH$_x$R$_{3-x}$, wherein R is and alkyl, alkanol or aryl group, linear or branched, substituted or not, and x is an integer comprised between 0 and 3;
    peroxocompounds;
    chelating ligands chosen among bi- or polydentate organic ligands;
    and mixtures thereof.

15. A method of manufacturing a mixed oxide of an alkaline-earth metal and a Group IV transition metal by solid-phase reaction, comprising heating an alkaline-earth metal carbonate powder comprising:
    a core consisting essentially of at least one alkaline-earth metal carbonate, said core having an average diameter of at most 0.25 µm; and
    a shell consisting essentially of at least one Group IV transition metal compound
optionally mixed with at least one Group IV transition metal compound, at a temperature of at least 500° C.

* * * * *

UNITED STATES PATENT AND TRADEMARK OFFICE
CERTIFICATE OF CORRECTION

| | |
|---|---|
| PATENT NO. | : 7,662,475 B2 |
| APPLICATION NO. | : 11/572745 |
| DATED | : February 16, 2010 |
| INVENTOR(S) | : Rocco Alessio et al. |

Page 1 of 1

It is certified that error appears in the above-identified patent and that said Letters Patent is hereby corrected as shown below:

On the title page, Item 75, Inventor Maria Teresa Buscaglia's City of Residence should read --Genova--

Column 13, line 13, Insert --metal-- before "Carbonate"

Column 13, line 18, Change "of0.001" to --of 0.001--

Signed and Sealed this

Fifteenth Day of June, 2010

David J. Kappos
*Director of the United States Patent and Trademark Office*